(12) United States Patent
Mullins et al.

(10) Patent No.: US 7,927,510 B2
(45) Date of Patent: Apr. 19, 2011

(54) CALCIUM HYPOCHLORITE COMPOSITIONS COMPRISING ZINC SALTS AND LIME

(75) Inventors: Richard M. Mullins, Cape Coral, FL (US); Michael J. Unhoch, Tyrone, GA (US)

(73) Assignee: Arch Chemicals, Inc., Norwalk, CT (US)

(*) Notice: Subject to any disclaimer, the term of this patent is extended or adjusted under 35 U.S.C. 154(b) by 858 days.

(21) Appl. No.: 11/788,640

(22) Filed: Apr. 20, 2007

(65) Prior Publication Data

US 2008/0258104 A1    Oct. 23, 2008

(51) Int. Cl.
  *C01B 11/06* (2006.01)
  *C02F 1/76* (2006.01)

(52) U.S. Cl. ........... 252/187.3; 252/187.28; 252/186.25; 252/175; 252/179; 210/756; 210/758

(58) Field of Classification Search ............. 252/187.28, 252/187.3
See application file for complete search history.

(56) References Cited

U.S. PATENT DOCUMENTS

| | | | |
|---|---|---|---|
| 3,440,024 A * | 4/1969 | Faust et al. | 23/300 |
| 3,544,267 A | 12/1970 | Dychdala | |
| 3,668,134 A | 6/1972 | Lamberti et al. | |
| 3,669,891 A | 6/1972 | Greenwood et al. | |
| 3,669,894 A | 6/1972 | Faust | |
| 3,760,064 A * | 9/1973 | Droste | 423/474 |
| 3,793,216 A | 2/1974 | Dychdala et al. | |
| 3,821,117 A | 6/1974 | Breece et al. | |
| 3,969,546 A | 7/1976 | Saeman | |
| 4,005,028 A | 1/1977 | Heckert et al. | |
| 4,035,484 A | 7/1977 | Faust et al. | |
| 4,048,351 A | 9/1977 | Saeman et al. | |
| 4,051,056 A | 9/1977 | Hartman | |
| 4,071,605 A | 1/1978 | Wojtowicz | |
| 4,087,360 A | 5/1978 | Faust et al. | |
| 4,118,524 A | 10/1978 | Saeman | |
| 4,145,306 A | 3/1979 | Tatara et al. | |
| 4,146,676 A | 3/1979 | Saeman et al. | |
| 4,174,411 A | 11/1979 | Saeman et al. | |
| 4,192,763 A * | 3/1980 | Buchan | 252/187.3 |
| 4,201,756 A | 5/1980 | Saeman et al. | |
| 4,208,344 A | 6/1980 | Dingwall et al. | |
| 4,216,027 A | 8/1980 | Wages | |
| 4,289,640 A | 9/1981 | Falivene | |
| 4,355,014 A | 10/1982 | Murakami et al. | |
| 4,380,533 A | 4/1983 | Wojtowicz | |
| 4,539,179 A | 9/1985 | Meloy | |
| 4,615,794 A | 10/1986 | Belanger | |
| 4,668,475 A | 5/1987 | Meloy | |
| 4,692,335 A * | 9/1987 | Iwanski | 424/665 |
| 4,780,216 A | 10/1988 | Wojtowicz | |

(Continued)

*Primary Examiner* — Joseph D Anthony
(74) *Attorney, Agent, or Firm* — Todd E. Garabedian; Wiggin and Dana LLP

(57) ABSTRACT

The present invention is directed to a granular water treatment composition, comprising: 35-95 wt % calcium hypochlorite; 1 to 50 wt % magnesium sulfate or a hydrate thereof; 0.1 to 10 wt % lime; and 0.1 to 55 wt % of a water soluble zinc salt or a hydrate thereof; wherein the weight percents are based on the total weight of the composition. The present invention is also directed to a water treatment tablet, comprising 35-95 wt % calcium hypochlorite; 1 to 50 wt % magnesium sulfate or a hydrate thereof; 0.1 to 10 wt % lime; and 0.1 to 10 wt % of a water soluble zinc salt or a hydrate thereof; wherein the weight percents are based on the total weight of the composition.

48 Claims, 1 Drawing Sheet

U.S. PATENT DOCUMENTS

| | | | |
|---|---|---|---|
| 4,865,760 A | 9/1989 | Johnson et al. | |
| 4,876,003 A | 10/1989 | Casberg | |
| 4,928,813 A | 5/1990 | Casberg | |
| 4,931,207 A | 6/1990 | Cramer et al. | |
| 4,961,872 A | 10/1990 | Sinclair | |
| 4,970,020 A | 11/1990 | Johnson et al. | |
| 4,973,409 A | 11/1990 | Cook | |
| 5,009,806 A | 4/1991 | Johnson et al. | |
| 5,164,109 A | 11/1992 | Wojtowicz | |
| 5,205,961 A | 4/1993 | Shenefiel et al. | |
| 5,610,126 A | 3/1997 | Bradford et al. | |
| 5,707,534 A | 1/1998 | DelCorral et al. | |
| 5,753,602 A | 5/1998 | Hung et al. | |
| 5,756,440 A | 5/1998 | Watanabe et al. | |
| 5,888,528 A | 3/1999 | Wellinghoff et al. | |
| 5,914,040 A | 6/1999 | Fescher et al. | |
| 5,958,853 A | 9/1999 | Watanabe | |
| 6,638,446 B1 * | 10/2003 | Mullins | 252/187.28 |
| 6,969,527 B2 | 11/2005 | Brennan et al. | |
| 6,984,398 B2 | 1/2006 | Brennan et al. | |
| 7,045,077 B2 * | 5/2006 | Garris | 252/186.36 |
| 7,364,669 B2 * | 4/2008 | Garris | 252/186.36 |
| 7,695,639 B2 * | 4/2010 | Garris | 252/186.36 |
| 2005/0279971 A1 * | 12/2005 | Garris | 252/601 |
| 2006/0081810 A1 | 4/2006 | Blanchette et al. | |
| 2006/0128584 A1 * | 6/2006 | Garris | 510/375 |
| 2007/0224108 A1 * | 9/2007 | Garris | 423/474 |

* cited by examiner

CALCIUM HYPOCHLORITE COMPOSITIONS COMPRISING ZINC SALTS AND LIME

BACKGROUND OF THE INVENTION

1. Field of the Invention

The present invention relates to compositions containing a mixture of hydrated calcium hypochlorite, hydrated magnesium sulfate, lime, and one or more basic zinc salts. More particularly, the present invention is directed to stable compositions for use in recreational water that contain a mixture of hydrated calcium hypochlorite, hydrated magnesium sulfate, lime, and one or more basic zinc salts that have long shelf life and high algaecidal and water clarifying properties.

2. Brief Description of Art

Calcium hypochlorite is known for use as a treatment for recreational water, such as pools, spas, hot tubs, and the like. Calcium hypochlorite serves as a source of chlorine, which acts as a disinfectant to keep recreational waters free of water-borne pathogens and other organisms such as algae. The prior art is replete with examples of calcium hypochlorite compositions, for example U.S. Pat. Nos. 3,793,216; 4,201,756; 4,876,003; 4,928,813; 4,145,306; 4,192,763; 4,692,335; 4,865,760; 4,961,872; 5,009,806; 5,164,109; and 5,753,602. In particular, U.S. Pat. Nos. 6,638,446 and 6,984,398 disclose compositions for treatment of recreational water that comprise mixtures of calcium hypochlorite and magnesium sulfate heptahydrate. U.S. Pat. No. 6,969,527 discloses compositions for treatment of recreational water that comprise mixtures of calcium hypochlorite, magnesium sulfate heptahydrate, and lime.

Calcium hypochlorite is available in various forms, including granular solid and tablet solid. Each of these forms have advantages and disadvantages. Granular forms offers lower shipping weight, less storage space, minimal spill hazards and safer handling. Convenient for shock treatment, granular calcium hypochlorite can be broadcast over the surface of the water, added to the pool skimmer with the circulation system running, or pre-diluted in water and added to the pool. Calcium hypochlorite in tablet form offers all the advantages of the granular form but is capable of more effectively delivering a continuous level of chlorination.

Solid forms of calcium hypochlorite generally contain between about 65 to 75 percent by weight available chlorine. However, since calcium hypochlorite breaks down over time, the shelf-life of typical solid calcium hypochlorite is estimated at approximately one year. During that time, when the product is stored in bulk at normal ambient temperatures ranging from approximately 65 to 95° F., the amount of available chlorine can decrease from approximately 70% to below label strength (generally about 65%) in one year or less. This loss can result in a formulation that is less effective at treating recreational water.

There is a need to have available a calcium hypochlorite composition that is stable for a long period of time yet still retains its algaecidal and water clarifying properties. The present invention is believed to be an answer to that need.

BRIEF SUMMARY OF THE INVENTION

In one aspect, the present invention is directed to a granular water treatment composition, comprising: 35 to 95 wt % calcium hypochlorite; 1 to 50 wt % magnesium sulfate or a hydrate thereof; 0.1 to 10 wt % lime; and 0.1 to 55 wt % of a water soluble zinc salt or a hydrate thereof; all weight percents based on the total weight of the composition.

In another aspect, the present invention is directed to a granular water treatment composition, consisting essentially of: from about 50 to about 70 wt % hydrated calcium hypochlorite; from about 25 to about 35 wt % magnesium sulfate heptahydrate; from about 1.0 to about 2.0 wt % lime; and from about 10.0 to about 13.0 wt % of a zinc sulfate monohydrate; optionally, from about 0.01 to about 20 wt % of additional ingredients selected from the group consisting of scale inhibiting agents, residue dispersing agents, colorants, chelating agents, buffers, fragrances, algaecides, fingicides, flocculants, clarifiers, and combinations thereof, wherein the composition contains at least about 17 wt % of water, all weight percents based on the total weight of the composition.

In another aspect, the present invention is directed to a water treatment tablet, comprising: 35-95 wt % calcium hypochlorite; 1 to 50 wt % magnesium sulfate or a hydrate thereof; 0.1 to 10 wt % lime; and 0.1 to 10 wt % of a water soluble zinc salt or a hydrate thereof; all weight percents based on the total weight of the tablet.

In another aspect, the present invention is directed to a water treatment tablet, consisting essentially of: from about 60 to about 75 wt % hydrated calcium hypochlorite; from about 20 to about 30 wt % magnesium sulfate heptahydrate; from about 1.0 to about 2.0 wt % lime; and from about 1.0 to about 3.0 wt % of a zinc sulfate monohydrate; optionally, from about 0.01 to about 20 wt % of additional ingredients selected from the group consisting of scale inhibiting agents, residue dispersing agents, colorants, chelating agents, buffers, fragrances, algaecides, fungicides, flocculants, clarifiers, and combinations thereof, wherein the composition contains at least about 17 wt % of water, all weight percents based on the total weight of the composition.

In another aspect, the present invention is directed to a water treatment composition, comprising: 35 to 95 wt % calcium hypochlorite; 1 to 50 wt % magnesium sulfate or a hydrate thereof; 0.1 to 10 wt % lime; and 0.1 to 55 wt % of a water soluble zinc salt or a hydrate thereof; all weight percents based on the total weight of the composition.

In another aspect, the present invention is directed to a method of treating recreational water, comprising the steps of adding to the recreation water the above granular or tablet water treatment compositions; followed by adding to the recreational water treatment one or more above tablets.

These and other aspects will become apparent upon reading the following detailed description of the invention.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
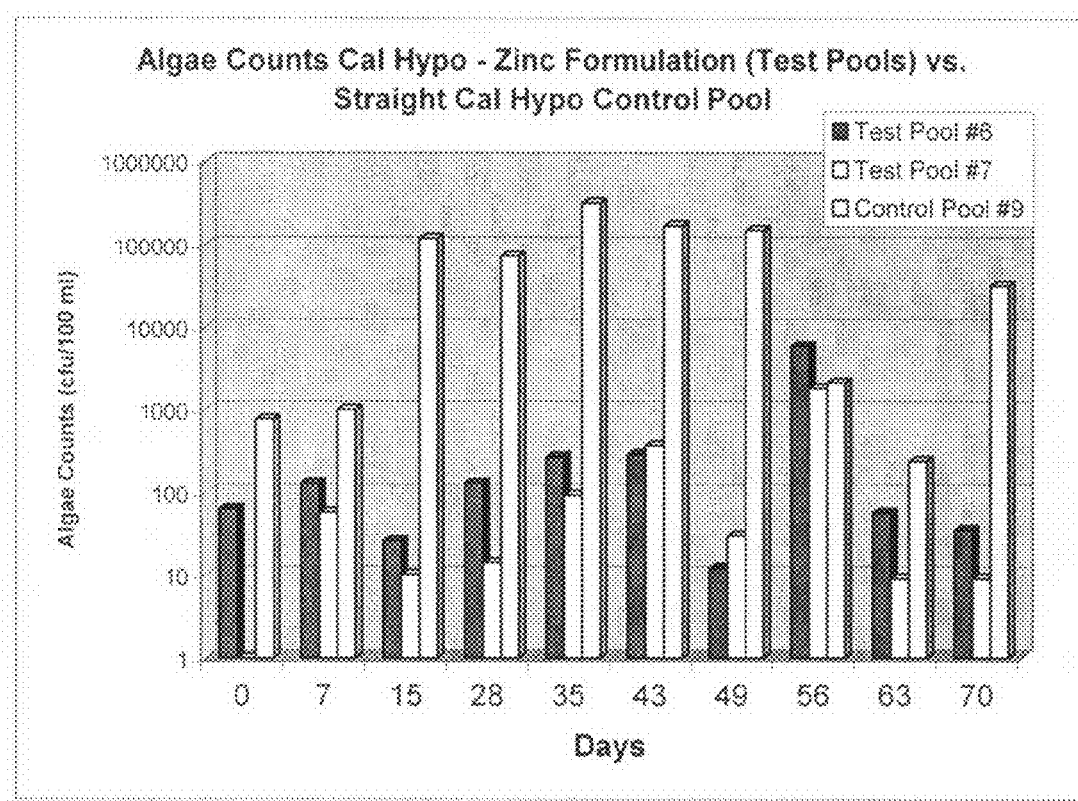
FIG. 1 shows algae counts in water treated with the composition of the present invention as compared to calcium hypochlorite alone.

The present invention is directed to a treatment composition for recreational water. The present inventors have found that a combination of calcium hypochlorite, magnesium sulfate, lime, and water soluble zinc salts can provide algaecide and algaestatic effects while simultaneously providing a stable composition with long shelf life. Improved shelf life is particularly important because it is known that calcium hypochlorite breaks down over time and such breakdown decreases the amount of chlorine available for sanitizing purposes. In addition, zinc salts, and in particular zinc sulfate, offer advantages over current algae preventatives in that they do not stain plaster surfaces with a greenish blue color or turn blonde hair green. The composition of the invention may be in granular form, or compacted into tablets, pellets, or other solid forms.

The following description will be understood in conjunction with the following definitions. The term "non-Division 5.1 Oxidizer" as used herein refers to any blend of calcium hypochlorite and magnesium sulfate that is not classified as a UN Division 5.1 Oxidizer according to standard testing procedures now in effect. The term "granular" as defined herein refers to particles having sizes ranging from about 140 to about 1800 microns in diameter. The term "tablet" as defined herein refers to a compressed solid article of the composition of the invention in any size or shape. Such tablets may be made according to any conventional tablet-making process and/or any conventional equipment that is used for making pool sanitizer tablets.

The term "hydrated" as used in conjunction with the composition of the present invention, or components thereof, refers to any substance that has a water content of at least 5% by weight. Similarly, the term "hydrate" as used in the context of a particular substance, refers to waters of hydration. Preferably, the compositions of the present invention consist of commercial "hydrated" (5.5% to 16% water) calcium hypochlorite, CAS number 7778-54-3 and magnesium sulfate heptahydrate, CAS number 10034-99-8. These preferred blends do not accelerate burning and are therefore non-oxidizers (as measured by the industry standard oxidizer classification test, i.e., United Nations Protocol Transport of Dangerous Goods—Oxidizing Substances of Division 5.1).

As indicated above, the present invention is directed to a water treatment composition comprising a combination of calcium hypochlorite, magnesium sulfate or a hydrate thereof, lime, and one or more zinc salts, or hydrates thereof. Each of these components is discussed in more detail below.

One component of the composition of the invention is calcium hypochlorite. Commercial neutral calcium hypochlorite compounds such as anhydrous calcium hypochlorite contain at least about 65 percent by weight of $Ca(OCl)_2$ and are quite suitable in preparing the compositions of the present invention. Also suitably used are "hydrated" forms of calcium hypochlorite containing at least about 55% by weight of $Ca(OCl)_2$ and have a water content of from about 4 to about 15 wt %. "Hydrated" calcium hypochlorite may be prepared by the methods described, for example, in U.S. Pat. Nos. 3,544,267 and 3,669,984, both of which are incorporated by reference in their entireties.

In general, the preferred amounts of calcium hypochlorite range from about 35 to about 95 wt %, more preferably from about 40 to about 90 wt %, and most preferably from about 50 to about 75 wt %, based on the total weight of the composition. When the composition of the invention is in granular form, preferred amounts of calcium hypochlorite range from 35 to 95 wt %, more preferably from 40 to 90 wt %, and most preferably from 50 to 70 wt %, all based on the total weight of the composition. In tabletted form, preferred amounts of calcium hypochlorite in the composition of the invention range from 35 to 95 wt %, more preferably from 50 to 85 wt %, and most preferably from 60 to 75 wt %, all based on the total weight of the composition.

The second component of the composition of the invention is magnesium sulfate. Both anhydrous ($MgSO_4$) and hydrated ($MgSO_4.xH_2O$) forms of magnesium sulfate may be used in the composition of the invention. Examples of hydrated forms include magnesium sulfate monohydrate ($MgSO_4.H_2O$) and magnesium sulfate heptahydrate ($MgSO_4.7H_2O$). In general, the preferred amounts of magnesium sulfate range from about 1 to about 50 wt %, more preferably from about 15 to about 40 wt %, and most preferably from about 20 to about 35 wt %, based on the total weight of the composition. In granular form, the composition preferably contains 10 to 50 wt % magnesium sulfate heptahydrate, more preferably 20 to 40 wt % magnesium sulfate heptahydrate, and most preferably 25 to 35 wt % magnesium sulfate heptahydrate. In tabletted form, preferred amounts of magnesium sulfate heptahydrate in the composition of the invention range from 10 to 50 wt %, more preferably 15 to 40 wt %, and most preferably 20 to 30 wt %, based on the total weight of the composition.

The third component of the composition of the invention is lime, preferably in the hydrated form $Ca(OH)_2$. In granular or tabletted form, the composition preferably contains 0.1 to 10 wt % lime, more preferably 0.5 to 5.0 wt % lime, and most preferably 1.0 to 2.0 wt % lime.

The fourth component of the composition of the invention is a water soluble zinc salt or a hydrate thereof. As defined herein, "water soluble zinc salt" refers to zinc salts that at least partially ionize when in contact with water. Examples of water soluble zinc salts include zinc salts of sulfate, carbonate, nitrate, borate, phosphate, acetate, and the like. Hydrates of these water soluble zinc salts may also be employed. Examples of particularly preferred water soluble zinc salts or hydrates thereof include, but are not limited to, zinc sulfate monohydrate ($ZnSO_4.H_2O$), zinc sulfate heptahydrate ($ZnSO_4.7H_2O$), zinc carbonate ($ZnCO_3$), zinc nitrate ($Zn(NO_3)_2$), zinc borate, zinc hydroxide, zinc phosphate, as well as combinations of these. Generally, the preferred amount of water soluble zinc salt ranges from about 0.1 to about 55 wt %, more preferably from about 0.5 to about 37.5 wt %, and most preferably from about 1.0 to about 13 wt %, all based on the total weight of the composition. In granular or compacted form, the composition preferably contains 0.1 to 55 wt % water soluble zinc salt or hydrate thereof, more preferably 5.0 to 37.5 wt % water soluble zinc salt or hydrate thereof, and most preferably 10.0 to 13.0 wt % water soluble zinc salt or hydrate thereof. In tabletted form, preferred amounts of water soluble zinc salt or hydrate thereof in the composition of the invention range from 0.1 to 10.0 wt %, more preferably 0.5 to 5.0 wt %, and most preferably 1.0 to 3.0 wt %, based on the total weight of the composition.

The composition of the present invention may also contain small amounts of other materials such as scale inhibiting agents (e.g., sodium tripolyphosphate (STPP), residue dispersing agents, colorants such as Ultramarine Blue, chelating agents, buffers, fragrances, algaecides, fungicides, flocculants, clarifiers, and the like. Such additional ingredients preferably comprise from 0.01 to 20 wt %, and more preferably from 0.1 to about 20 wt %, based on the total weight of the composition.

Preferably, the compositions of the present invention contain at least about 17% by weight water based on the total weight of the composition, and more preferably about 18% to about 24% by weight of the composition. The amount of water in the composition may be calculated by any standard analytical method for measuring water in chemical products. Our preferred method is thermogravimetric analysis (TGA).

The composition of the invention is prepared by combining the four critical ingredients to produce an essentially homogeneous granular mixture. The granular mixture is ready for packaging, storage, shipping and use in the purification of water and the like. Specifically, these granular products are useful as water treatment sanitizers (e.g. in swimming pools and spas). In some cases, it may be desirable to form tablets and other shaped products from these granular mixtures. The tabletted products of the present invention may be made from the granular mixture according to any conventional tabletting process and equipment normally used for making calcium hypochlorite hydrate-containing tablets. Any suitable equipment that produces molded compacted products such as tablets, caplets or briquettes, or other known molded compacted products, using the blends of the present invention may be used. Any shape or size tablet may be used. One preferred form of tablet is shown in U.S. Pat. No. 4,876,003. The preferred size tablet of that cylindrical shape is about 4 inches in length and about 1.8 inch in diameter. Preferred tabletting equipment includes hydraulic presses (such as Hydratron or Hydramet or Bipel hydraulic presses). Any suitable dwell times and pressures may be used in operating such hydraulic presses. Specifically, these tablets are useful as water treatment sanitizers (e.g. in swimming pools and spas).

The tabletted compositions of the present invention have an average dissolving rate of less than about 150 grams/day. In other words, a 300 gram tablet will take at least 2 days to dissolve completely in a standing (non-flowing) body of water. Preferably, the average dissolving rate is less than 100 grams per day for the tablets of the present invention. It should be recognized that the average dissolving rate of the tabletted blends of the present invention will generally have higher dissolving rates in flowing water conditions such as in a skimmer or a feeder in a swimming pool. The term "average dissolving rate" as used herein means the static average dissolving rate of the tabletted blends of the present invention in a standing volume of water.

Either the granular compacted or tabletted form may be used as treatments for recreational water. In one embodiment, it is contemplated that the granular formulations be used initially as a "shock" treatment, followed by the tabletted formulations as an ongoing maintenance treatment. In one embodiment, the granular product is added at a dose rate of about 2 pounds per 10,000 gallons of recreational water to provide a residual zinc concentration of about 1 ppm. This is followed by the application of 1-2 250-300 gram tablets per week per 10,000 of water in order to maintain recommended free chlorine residuals at 1-3 ppm while simultaneously maintaining the zinc concentration at about 1 ppm. In another embodiment, tablets may be used as the initial treatment, followed by more tablets as part of the maintenance routine.

EXAMPLES

The present invention is further described in detail by means of the following Examples and Comparisons. All parts and percentages are by weight and all temperatures are degrees Celsius unless explicitly stated otherwise.

Various formulations of the compositions of the present invention were evaluated for shelf life stability. Four granular and two tabletted formulations were analyzed and compared to two control formulations as follows:

| | |
|---|---|
| Formulation 1 (Granular): | 12.5% zinc sulfate monohydrate, 2.0% lime, 20% magnesium sulfate heptahydrate, 65.5% calcium hypochlorite. |
| Formulation 2 (Granular): | 12.5% zinc sulfate monohydrate, 20% magnesium sulfate heptahydrate, 67.5% calcium hypochlorite. |
| Formulation 3 (Granular): | 12.5% zinc sulfate monohydrate, 2.0% lime, 30% magnesium sulfate heptahydrate, 55.5% calcium hypochlorite. |
| Formulation 4 (Granular) | 12.5% zinc sulfate monohydrate, 30% magnesium sulfate heptahydrate, |

-continued

| | |
|---|---|
| | 57.5% calcium hypochlorite. |
| Formulation 5 (Granular) | 2.0% zinc sulfate monohydrate, 98.0% calcium hypochlorite. |
| Formulation 6 (Tablet) | 2.0% zinc sulfate monohydrate, 30% magnesium sulfate heptahydrate, 1% sodium tripolyphosphate, 0.05% Ultramarine blue, 64.95% calcium hypochlorite. |
| Formulation 7 (Tablet) | 2.0% zinc sulfate monohydrate, 20% magnesium sulfate heptahydrate, 2.0% lime, 1% sodium tripolyphosphate, 0.05% Ultramarine blue, 74.95% calcium hypochlorite. |
| Formulation 8 (Tablet) | 2.0% zinc sulfate monohydrate, 2.0% lime, 1% sodium tripolyphosphate, 0.05% Ultramarine blue, 94.95% calcium hypochlorite. |
| Formulation 9 (Granular Control) | HTH Pool Shock (70% calcium hypochlorite, 30% magnesium sulfate heptahydrate having 47% available chlorine). |
| Formulation 10 (Tablet Control) | Tablet of 30% magnesium sulfate heptahydrate, 1.7% lime, 1% sodium tripolyphosphate, 0.05% Ultramarine blue, and having 47.6% available chlorine. |

A standard 30-day oven study at 45° C. was used to evaluate relative shelf life stability versus unformulated and formulated control samples based on loss of available chlorine.
Granular Stability The results show that the granular formulations containing zinc sulfate monohydrate and lime (Formulations 1 and 3) were more stable than the control formulations. The loss of available chlorine for the formulated products with zinc sulfate monohydrate and lime had an average chlorine loss of 1.82±0.1% versus 2.69±0.13% for control. The unformulated product with zinc sulfate monohydrate and lime (Formulation 5) was also more stable (average chlorine loss of 3.09±0.14% versus 3.74±0.19% for the unformulated control). The trend was consistent over a 30-day test period.

A linear least squares data confirmed that Formulation 3 was the most stable of all of the control and test formulations for the 30 day period. The data also shows that the combination of zinc sulfate monohydrate and lime helped stabilize Formulations 1 and 3 when compared to the formulated control. The zinc sulfate monohydrate also improved stability of Formulation 5 when compared to the unformulated control.
Tablet Stability Comparison of the stability data for the tablets showed that the tablet formulations were generally less stable than the granular formulations. Nevertheless, the formulated tablets of Formulation 6 were consistently more stable than the formulated control tablets. The main difference between the tablets was the zinc sulfate monohydrate at 2.0%.
Performance in Recreational Water Two 7,500-gallon above-ground test pools were filled with fresh water that was balanced prior to study execution. Each of the pools was treated using unstabilized chlorine prior to beginning the study using the test and control substances. Each pool also received a dosage of cyanuric acid (stabilizer) to achieve a minimum of 24 ppm residual. The cyanuric acid was maintained above 24 ppm throughout the study. Each pool received an initial dose of the granular formulated product of 1.5 lbs (2 lb/10 kgallons). This provided a zinc residual of 1 ppm in the water. The pools were maintained routinely using the formulated tablets in order to maintain 1-3 ppm free chlorine residual. Each tablet provided about 0.0155 ppm zinc. The zinc concentration was reestablished whenever the level fell below 0.5 ppm. The reestablishment dose was administered by adding 0.75 lbs of the granular formulated product which provided 0.5 ppm zinc residual.

The pools were shocked weekly with an unformulated calcium hypochlorite product. The water balance parameters were measured using an appropriate test kit for testing pool water. The total chlorine, free chlorine, calcium hardness, total alkalinity and cyanuric acid were tested at the beginning of the study and a minimum of two times per week. The zinc concentration was tested weekly using LaMotte Zinc 7417-01-ZN-LR (0-1.4 ppm Zn) or equivalent. Water clarity was visually assessed according to the rating systems below whenever the water was tested.

| Rating Scale for Visual Assessment of Water Clarity | |
| --- | --- |
| Rating | Water Clarity Description |
| 0 | Sparkling clear water |
| 1 | Water appears dull, slight haze present |
| 2 | Main drain is visible but not distinct |
| 3 | Bottom of shallow end of visible, main drain is not |
| 4 | Cannot see bottom in the shallow end |

An acceptable clarity rating has been determined to be 1. This criterion was based on many years of experience with how the pool owners would constitute acceptable.

Algae and Bather Load Insults and Assessment

Algae and bather load insults shall were added directly to each pool every week. The bather load was prepared in distilled water as listed in Table below:

| Quantities of components required for 2-liter bather load insult solution | |
| --- | --- |
| Component | Weight in grams for 2-liter stock solution |
| Urea | 50.29 g |
| Albumin | 7.8 g |
| Creatinine | 3.4 g |
| Lactic Acid | 2.67 g |
| Uric Acid | 1.24 g |
| Glucuronic Acid | 0.94 g |
| Sodium Chloride | 17.75 g |
| Sodium Sulfate | 28.36 g |
| Ammonium Chloride | 5.58 g |
| Sodium bicarbonate | 5.38 g |
| Potassium Phosphate, dibasic | 9.12 g |
| Potassium Sulfate | 8.11 g |

50-mL of the bather-load insult solution was added directly to each pool every week.

Stock cultures of *Chlorella pyrenoidosa* and *Pleurochloris pyrenoidosa* were maintained in Kratz & Meyers medium and *Phormidium* sp., a filamentous blue-green alga, were maintained in BG-11. 99.9 mL of each inoculum (three in total) were added to the pools. Typically, the cultures contained approximately $2 \times 10^7$ cells/mL; therefore, approximately $2 \times 10^9$ cells were added per pool each week. Water samples were collected and submitted to on a weekly basis for algae counts. Algae were also visually assessed according to the rating systems below whenever the water was tested. The rating scale used to assess algal presence is as follows.

| Rating Scale for Visual Assessment of Algae | |
| --- | --- |
| Rating | Algae Description |
| 0 | No trace of visible algae anywhere in the pool |
| 1 | Trace amounts present on pool sides or bottom |
| 2 | Small patches easily observed on pool sides and bottom |
| 3 | Large patches easily observed on pool sides and bottom |
| 4 | 25% or more of pool sides and bottom covered by algae |

An acceptable algae rating has been determined to be 1.

FIG. 1 shows results for two formulations of the present invention and one control composition that does not contain zinc. In FIG. 1, the product applied to "Test Pool #6" was a granular formulation made from 12.0% by weight zinc sulfate monohydrate, 30% by weight $MgSO_4(H_2O)_7$, 2.0% by weight $Ca(OH)_2$, and 56.0% by weight calcium hypochlorite. This formulation had an average chlorine content of about 38.1%. The product applied to "Test Pool #7" was a tabletted formulation made from 0.7% by weight zinc sulfate monohydrate, 20.25% by weight $MgSO_4(H_2O)_7$, 2.0% by weight $Ca(OH)_2$, 0.05% by weight Ultramarine blue, 77.0% by weight calcium hypochlorite. This formulation had an average chlorine content of about 52.4%. These formulations were compared to a control ("Control Pool #9") which included 3-trichloro-s-triazinetrione tablets for maintaining a chlorine residual and a weekly treatment of unformulated calcium hypochlorite shock (78% available chlorine). The control pool was stabilized with an initial dose of 25 ppm cyanuric acid.

FIG. 1 shows that the algae counts for the control pools that do not contain zinc were consistently higher than the algae counts for the test pools which were treated with formulations that include zinc. These results demonstrate the superior performance of the compositions of the present invention over the control system.

Maintenance

The chlorine tablets were added to the pool skimmer basket whenever either the free chlorine fell below permissible level or there was less than ¼ of the tablet(s) remaining in the skimmer basket. During a maintenance protocol, the pool is shocked weekly using a 68% available chlorine shock product.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entireties.

What is claimed is:

1. A granular water treatment composition, comprising:
   35 to to about 90 wt % calcium hypochlorite;
   10 to 50 wt % magnesium sulfate or a hydrate thereof;
   0.5 to 5 wt % lime; and
   1 to 37.5 wt % of a water soluble zinc salt or a hydrate thereof; all weight percents based on the total weight of said composition.

2. The water treatment composition of claim 1, wherein said calcium hypochlorite comprises from about 40 to about 90 wt %, based on the total weight of said composition.

3. The water treatment composition of claim 1, wherein said calcium hypochlorite comprises from about 50 to about 70 wt %, based on the total weight of said composition.

4. The water treatment composition of claim 1, wherein said magnesium sulfate is magnesium sulfate heptahydrate.

5. The water treatment composition of claim 4, wherein said magnesium sulfate heptahydrate comprises from about 20 to about 40 wt %, based on the total weight of said composition.

6. The water treatment composition of claim 4, wherein said magnesium sulfate heptahydrate comprises from about 25 to about 35 wt %, based on the total weight of said composition.

7. The water treatment composition of claim 1, wherein said lime comprises from about 0.5 to 2.5 wt %, based on the total weight of said composition.

8. The water treatment composition of claim 1, wherein said lime comprises from about 1.0 to 2.0 wt %, based on the total weight of said composition.

9. The water treatment composition of claim 1, wherein said water soluble zinc salt or a hydrate thereof is selected from the group consisting of zinc sulfate monohydrate, zinc sulfate heptahydrate, zinc carbonate, zinc carbonate, zinc carbonate hydroxide hydrate, zinc nitrate and hydrates thereof, zinc borate, zinc hydroxide, zinc phosphate and hydrates thereof, isomorphous zinc/magnesium salts, and combinations thereof.

10. The water treatment composition of claim 1, wherein said water soluble zinc salt or a hydrate thereof comprises from about 5.0 to 37.5 wt %, based on the total weight of said composition.

11. The water treatment composition of claim 1, wherein said water soluble zinc salt or a hydrate thereof comprises from about 10.0 to 13 wt %, based on the total weight of said composition.

12. The water treatment composition of claim 1, further comprising additional ingredients selected from the group consisting of scale inhibiting agents, residue dispersing agents, colorants, chelating agents, buffers, fragrances, algaecides, fungicides, flocculants, clarifiers, and combinations thereof, wherein said additional ingredients comprise from 0.01 to 20 wt %, based on the total weight of said composition.

13. The water treatment composition of claim 12, wherein said additional ingredients comprise from about 0.1 to about 20 wt % based on the total weight of said composition.

14. The water treatment composition of claim 1, further comprising at least about 17 wt % of water, based on the total weight of said composition.

15. The water treatment composition of claim 14, wherein said composition contains from about 18 to about 24 wt % water, based on the total weight of said composition.

16. A granular water treatment composition, consisting essentially of:
  from about 50 to about 70 wt % hydrated calcium hypochlorite;
  from about 25 to about 35 wt % magnesium sulfate heptahydrate;
  from about 1.0 to about 2.0 wt % lime; and
  from about 10.0 to about 13.0 wt % of a zinc sulfate monohydrate;
  optionally, from about 0.01 to about 20 wt % of additional ingredients selected from the group consisting of scale inhibiting agents, residue dispersing agents, colorants, chelating agents, buffers, fragrances, algaecides, fungicides, flocculants, clarifiers, and combinations thereof,
  wherein said composition contains at least about 17 wt % of water, all weight percents based on the total weight of said composition.

17. The water treatment composition of claim 16, wherein said composition contains from about 18 to about 24 wt % water, based on the total weight of said composition.

18. A water treatment tablet, comprising:
  35 to about 85 wt % calcium hypochlorite;
  15 to about 40 wt % magnesium sulfate or a hydrate thereof;
  0.5 to 5.0 wt % lime; and
  0.5 to 10 wt % of a water soluble zinc salt or a hydrate thereof; all weight percents based on the total weight of said tablet.

19. The water treatment tablet of claim 18, wherein said calcium hypochlorite comprises from about 50 to about 85 wt %, based on the total weight of said tablet.

20. The water treatment tablet of claim 18, wherein said calcium hypochlorite comprises from about 60 to about 75 wt %, based on the total weight of said tablet.

21. The water treatment composition of claim 18, wherein said magnesium sulfate is magnesium sulfate heptahydrate.

22. The water treatment tablet of claim 21, wherein said magnesium sulfate heptahydrate comprises from about 20 to about 30 wt %, based on the total weight of said tablet.

23. The water treatment tablet of claim 18, wherein said lime comprises from about 1.0 to 2.0 wt %, based on the total weight of said tablet.

24. The water treatment tablet of claim 18, wherein said water soluble zinc salt or a hydrate thereof is selected from the group consisting of zinc sulfate monohydrate, zinc sulfate heptahydrate, zinc carbonate, zinc carbonate, zinc carbonate hydroxide hydrate, zinc nitrate and hydrates thereof, zinc borate, zinc hydroxide, zinc phosphate and hydrates thereof, isomorphous zinc/magnesium salts, and combinations thereof.

25. The water treatment tablet of claim 18, wherein said water soluble zinc salt or a hydrate thereof comprises from about 0.5 to 5.0 wt %, based on the total weight of said tablet.

26. The water treatment tablet of claim 18, wherein said water soluble zinc salt or a hydrate thereof comprises from about 1.0 to 3.0 wt %, based on the total weight of said tablet.

27. The water treatment tablet of claim 18, further comprising additional ingredients selected from the group consisting of scale inhibiting agents, residue dispersing agents, colorants, chelating agents, buffers, fragrances, algaecides, fungicides, flocculants, clarifiers, and combinations thereof, wherein said additional ingredients comprise from 0.01 to 20 wt %, based on the total weight of said tablet.

28. The water treatment tablet of claim 27, wherein said additional ingredients comprise from about 0.1 to about 20 wt % based on the total weight of said tablet.

29. The water treatment tablet of claim 18, further comprising at least about 17 wt % of water, based on the total weight of said tablet.

30. The water treatment tablet of claim 29, wherein said composition contains from about 18 to about 24 wt % water, based on the total weight of said composition.

31. A water treatment tablet, consisting essentially of:
  from about 60 to about 75 wt % hydrated calcium hypochlorite;
  from about 20 to about 30 wt % magnesium sulfate heptahydrate;
  from about 1.0 to about 2.0 wt % lime; and
  from about 1.0 to about 3.0 wt % of a zinc sulfate monohydrate;
  optionally, from about 0.01 to about 20 wt % of additional ingredients selected from the group consisting of scale inhibiting agents, residue dispersing agents, colorants, chelating agents, buffers, fragrances, algaecides, fungicides, flocculants, clarifiers, and combinations thereof, wherein said composition contains at least about 17 wt % of water, all weight percents based on the total weight of said composition.

32. The water treatment tablet of claim 31, wherein said tablet contains from about 18 to about 24 wt % water, based on the total weight of said composition.

33. A water treatment composition, comprising:
   35 to about 85 wt % calcium hypochlorite;
   15 to about 40 wt % magnesium sulfate or a hydrate thereof;
   0.5 to 5 wt % lime; and
   0.5 to 37.5 wt % of a water soluble zinc salt or a hydrate thereof; all weight percents based on the total weight of said composition.

34. The water treatment composition of claim 33, wherein said calcium hypochlorite comprises from about 40 to about 90 wt %, based on the total weight of said composition.

35. The water treatment composition of claim 33, wherein said calcium hypochlorite comprises from about 50 to about 75 wt %, based on the total weight of said composition.

36. The water treatment composition of claim 33, wherein said magnesium sulfate is magnesium sulfate heptahydrate.

37. The water treatment composition of claim 36, wherein said magnesium sulfate heptahydrate comprises from about 20 to about 35 wt %, based on the total weight of said composition.

38. The water treatment composition of claim 33, wherein said lime comprises from about 0.1 to 2.0 wt %, based on the total weight of said composition.

39. The water treatment composition of claim 33, wherein said water soluble zinc salt or a hydrate thereof is selected from the group consisting of zinc sulfate monohydrate, zinc sulfate heptahydrate, zinc carbonate, zinc carbonate, zinc carbonate hydroxide hydrate, zinc nitrate and hydrates thereof, zinc borate, zinc hydroxide, zinc phosphate and hydrates thereof, isomorphous zinc/magnesium salts, and combinations thereof.

40. The water treatment composition of claim 33, wherein said water soluble zinc salt or a hydrate thereof comprises from about 1.0 to 13 wt %, based on the total weight of said composition.

41. The water treatment composition of claim 33, further comprising additional ingredients selected from the group consisting of scale inhibiting agents, residue dispersing agents, colorants, chelating agents, buffers, fragrances, algaecides, fungicides, flocculants, clarifiers, and combinations thereof, wherein said additional ingredients comprise from 0.01 to 20 wt %, based on the total weight of said composition.

42. The water treatment composition of claim 33, wherein said additional ingredients comprise from about 0.1 to about 20 wt % based on the total weight of said composition.

43. The water treatment composition of claim 33, wherein said composition contains from about 18 to about 24 wt % water, based on the total weight of said composition.

44. The water treatment composition of claim 33, wherein said composition is in a granular form.

45. The water treatment composition of claim 33, wherein said composition is in a compacted form.

46. The water treatment composition of claim 45, wherein said compacted form is a tablet or briquette.

47. The water treatment composition of claim 33, further comprising at least about 17 wt % of water, based on the total weight of said composition.

48. The water treatment composition of claim 47, wherein said composition contains from about 18 to about 24 wt % water, based on the total weight of said composition.

* * * * *